US010371216B2

(12) United States Patent
Smid et al.

(10) Patent No.: US 10,371,216 B2
(45) Date of Patent: Aug. 6, 2019

(54) DRAIN VALVE

(71) Applicant: Punch Powertrain N.V., Sint-Truiden (BE)

(72) Inventors: Peter Mark Smid, Sint-Truiden (BE); Stefan Hubertus Godelieve Van Raemdonck, Sint-Truiden (BE)

(73) Assignee: PUNCH POWERTRAIN N.V., Sint-Truiden (BE)

( * ) Notice: Subject to any disclaimer, the term of this patent is extended or adjusted under 35 U.S.C. 154(b) by 110 days.

(21) Appl. No.: 15/563,130

(22) PCT Filed: Apr. 1, 2016

(86) PCT No.: PCT/EP2016/057219
§ 371 (c)(1),
(2) Date: Sep. 29, 2017

(87) PCT Pub. No.: WO2016/156572
PCT Pub. Date: Oct. 6, 2016

(65) Prior Publication Data
US 2018/0080507 A1 Mar. 22, 2018

(30) Foreign Application Priority Data

Apr. 2, 2015 (BE) .................................. 2015/5215

(51) Int. Cl.
*B60T 13/12* (2006.01)
*F15B 11/16* (2006.01)
(Continued)

(52) U.S. Cl.
CPC ............ *F16D 25/123* (2013.01); *B60T 13/12* (2013.01); *B60T 15/02* (2013.01); *F16D 25/14* (2013.01);
(Continued)

(58) Field of Classification Search
CPC .......... F16D 25/14; F16D 25/123; F16D 7/04; B60T 15/02; F16H 61/0021;
(Continued)

(56) References Cited

U.S. PATENT DOCUMENTS 4,772,249 A 9/1988 Kouno et al.
5,481,872 A 1/1996 Karakama et al.
(Continued)

FOREIGN PATENT DOCUMENTS

CN 102022526 A 4/2011
CN 103671893 A 3/2014
(Continued)

OTHER PUBLICATIONS

International Search Report PCT/EP2016/057219 dated Jun. 16, 2016.
(Continued)

*Primary Examiner* — F Daniel Lopez
*Assistant Examiner* — Daniel S Collins
(74) *Attorney, Agent, or Firm* — Pillsbury Winthrop Shaw Pittman, LLP

(57) ABSTRACT

A hydraulic system for a multiple friction transmission, comprising: a first pressure relief valve 5 regulable by means of a first pilot pressure; a normally-open drain valve 8, which is a directional valve switchable between an open state and a closed state by means of a second pilot pressure; at least one first pressure regulator 11 for operating the drain valve by means of a first pilot pressure and a second pilot pressure, respectively; wherein in the event of detrimental hydraulic pressure build up, the second pilot pressure is dropped to open the drain valve, so as to relieve pressure through the drain line.

15 Claims, 7 Drawing Sheets

(51) Int. Cl.
  *F16D 48/02* (2006.01)
  *F16D 25/12* (2006.01)
  *F16H 61/00* (2006.01)
  *F16H 61/02* (2006.01)
  *B60T 15/02* (2006.01)
  *F16D 67/04* (2006.01)
  *F15B 13/02* (2006.01)
  *F15B 13/06* (2006.01)

(52) U.S. Cl.
  CPC ......... *F16D 67/04* (2013.01); *F16H 61/0021* (2013.01); *F16H 61/0025* (2013.01); *F16H 61/0206* (2013.01); *F15B 11/16* (2013.01); *F15B 13/024* (2013.01); *F15B 13/06* (2013.01); *F15B 2211/30525* (2013.01); *F15B 2211/50518* (2013.01); *F15B 2211/50536* (2013.01); *F15B 2211/5157* (2013.01); *F15B 2211/528* (2013.01); *F15B 2211/55* (2013.01); *F15B 2211/575* (2013.01); *F15B 2211/6355* (2013.01); *F15B 2211/67* (2013.01); *F15B 2211/863* (2013.01); *F15B 2211/8633* (2013.01); *F15B 2211/8752* (2013.01)

(58) Field of Classification Search
  CPC ............. F16H 61/0025; F16H 61/0206; F15B 13/024; F15B 11/16; F15B 13/06
  See application file for complete search history.

(56) References Cited

U.S. PATENT DOCUMENTS

| | | |
|---|---|---|
| 2007/0107421 A1 | 5/2007 | Emmert et al. |
| 2013/0184119 A1 | 7/2013 | Druten et al. |
| 2015/0084403 A1* | 3/2015 | Elving .................. B64C 27/12 |
| | | 303/71 |

FOREIGN PATENT DOCUMENTS

| | | |
|---|---|---|
| CN | 104100706 A | 10/2014 |
| EP | 1522754 A1 | 4/2005 |

OTHER PUBLICATIONS

First Office Action issued in corresponding Chinese Patent Application No. 201680021002.6 dated Nov. 20, 2018 with English translation.

\* cited by examiner

DRAIN VALVE

CROSS-REFERENCE TO RELATED APPLICATIONS

This is the U.S. National Stage of PCT/EP2016/057219, filed Apr. 1, 2016, which claims priority to Belgium Application No. 2015/5215, filed Apr. 2, 2015, the contents of each of these applications being incorporated herein by reference in their entireties.

FIELD OF THE INVENTION

The invention relates to a hydraulic system for a multiple friction transmission comprising a redundant fail safe.

BACKGROUND TO THE INVENTION

Generally, a transmission provides controlled application of engine power by conversion of speed and torque from a power source, such as for example an internal combustion engine. The hydraulic system may provide for actuation of friction elements in the vehicle transmission for coupling the transmission input to the geartrain to transmit engine power to the wheels of the vehicle. For example a clutch module in a dual clutch transmission (DCT) typically comprises two friction clutches for coupling the engine via a geartrain to the wheels by actuation of these clutches via said hydraulic system. In a variant one or more clutches can be made by using a powersplit mechanism with three rotational members where one member is connected to the input, one member is connected to the output and the third member can be connected to the transmission housing by means of actuation of a friction brake. Multiple configurations of these friction elements (clutch, brake) can be made resulting in various layouts of multi-friction transmissions. A transmission system of this type is know from e.g. US2013184119.

The brake and/or clutch elements can generate a considerable heat and the hydraulic system may also provide cooling fluid to each of the clutches and/or brakes of the transmission.

In a multiple friction transmission, such as for example a dual clutch transmission (DCT), a dual wet clutch may be oil cooled. Typically, the electrohydraulic control of the dual clutch transmission provides significant improved efficiency and performance, while maintaining the full shift comfort of traditional step automatics. A precise and fast clutch control can be made possible by direct acting solenoids, which are electromechanically operated valves.

Fundamentally, a DCT can be of the wet clutch or the dry clutch design. A wet clutch design is preferably used for higher torque engines, whereas the dry clutch design is generally suited for smaller torque engines. Although the dry clutch variants of a DCT may be limited in torque generation, compared to their wet clutch counterparts, the dry clutch variants may offer an improved fuel efficiency, mainly due to the cooling and lubrication. The wet clutch requires pumping transmission fluid in the clutch housing, which results in losses. Therefore, additionally, the cooling system in a multiple friction transmission may play an important role for the overall efficiency of the transmission.

A DCT layout is equivalent of having two transmissions in one housing which can be shifted and clutched independently, i.e. one power transmission assembly on each of the two input shafts together driving one output shaft, to enable uninterrupted gear shifting transmission in an automatic transmission form, while keeping high mechanical efficiency compared to a manual transmission.

The pump pressure of the clutch and/or brake actuation line in the hydraulic system determines whether the clutch element and/or brake element is actuated or not. When the actuation pressure in the clutch actuation line is low, then the clutch is disengaged. Commonly, a normally closed (NC) solenoid valve is arranged in the clutch actuation line, so that in the event that the first pressure circuit needs to be depressurized, for example due to a failure created by an electric malfunction, the valve will automatically close to prevent loss of control. However, if the valve fails in the open position, pressure in the clutch actuation line may stay high, which is undesirable. It is desirable that this state, wherein the clutch remains under pressure by which the drive of the engine cannot be disengaged, is avoided. Thus, if the hydraulic pressure in the clutch and/or brake actuation line is unexpectedly too high, for any reason whatsoever, a loss of user control over the vehicle may be induced. In the prior art, this problem is commonly addressed by providing two NC solenoid valves in the actuation lines of the hydraulic circuit, which are connected hydraulically one behind the other in series. In case of failure of one of the two said valves in an open state, the other valve can still be used to control the pressure in the clutch and/or brake actuation line.

However, the above-mentioned technical solution for providing a redundant fail safe is typically expensive and economically not attractive, since the arrangement of solenoid valves, comprising electronic components, is significantly more expensive than spool valves, i.e. valves controlled by a terminal fluid pressure. Furthermore, a spool valve is typically more robust and has a longer lifetime, compared to a solenoid valve.

Publication US2007/0107421A1 discloses a hydraulic circuit for an engine driven vehicle, comprising a higher pressure circuit and a lower pressure circuit. The hydraulic system controls fluid communication with an infinitely variable transmission (IVT) which includes higher pressure hydrostatic unit controls and lower pressure IVT hydraulic control clutches. When the demand of the higher pressure controls are satisfied, a relief valve opens and supplies fluid from the first high pressure supply line to the second lower pressure supply line. In this way, the low pressure pump can be minimally sized so as to supply only the normal requirements of clutch unit. However, a pressure-build up in a friction element actuation line, such as a clutch actuation line and/or a brake actuation line, connected to the higher pressure circuit, may result in a loss of control of the engine driven vehicle.

An insufficient cooling may lead to shortened component life and ultimately failure of the clutch assemblies within the multiple friction transmission. Moreover, insufficient cooling can be responsible for rapid degradation of the physical properties of the transmission fluid which may result a failure of other components within the multiple friction transmission.

Typically the clutch assemblies are cooled by transmission fluid, in a generally uncontrolled fashion, in order to provide sufficient cooling for the excessive heat generated in the multiple friction transmission. However, this cooling strategy typically goes hand-in-hand with losses in efficiency by excessively flooding of the clutch assemblies with fluid to provide sufficient heat reduction.

Also, high loading conditions may result in rapid generation of excessive heat. Conventional heat strategies are typically not appropriate or adequate to efficiently dissipate said rapid heat build-up. Therefore, excessive demands is put on the pump for providing the demanded fluid in these cases.

In the prior art, conventional cooling approaches of a multiple friction transmission typically use a single hydraulic cooling circuit to supply cooling fluid from the cooler device to the clutches. The cooling is controlled by the fluid pressure in the hydraulic cooling circuit, to provide a flow of cooling fluid to each of the clutches of the multiple friction transmission.

Often, the cooling system of a DCT limits the total oil flow to both clutches in the event that no hydraulic fluid or only a low amount of hydraulic oil is needed. Typically, a flow limiter is arranged as a differential pressure regulator keeping the pressure drop over the flow regulators constant. This feature is meant to limit the pressure in the cooling lines so that the low pressure pump can work at a lower pressure, and thus consumes less power. However, often the clutches require different cooling due to the difference in clutch power dissipation. Currently this is not optimally handled by the cooling strategies in the prior art, resulting in a reduced efficiency.

It can be challenging and/or complicated to control and regulate the hydraulic system for a multiple friction transmission to achieve the desired vehicle occupant comfort and safety goals. A proper timing and execution of events are required for efficient and/or smooth gear shifting.

So, there is a need for a hydraulic system for a multiple friction transmission that addresses at least one of the above mentioned drawbacks while maintaining the advantages.

SUMMARY OF THE INVENTION

Thereto, the invention provides for a hydraulic system for a multiple friction transmission according to claim 1.

The multiple friction transmission may comprise a brake element and a clutch element for coupling and transmitting engine power from the engine to the wheels of the vehicle by actuation of the brake element and clutch element via said hydraulic system.

Further, the hydraulic system comprises at least one pressure pump supplying pressurized fluid to a first pressure circuit via a first pressure pump outlet line. The first pressure circuit is in fluid connection with a brake actuation line and clutch actuation line actuating the brake element and clutch element respectively. The hydraulic system further comprises a first pressure relief valve, arranged in a pressure controlled hydraulic line branched off at the first pressure pump outlet line. The first pressure relief valve is regulable by means of a first pilot pressure through a first pilot pressure line by at least one first pressure regulator for operating the first pressure relief valve by means of the first pilot pressure through the first pilot pressure line. The hydraulic system further comprises a drain valve which is arranged in a pressure drain hydraulic line, branched off at the first pressure pump outlet line, which is different from the pressure controlled hydraulic line. The drain valve is a normally-open (NO) directional valve switchable between an open state and a closed state by means of a second pilot pressure through a second pilot pressure line, said second pilot pressure line in fluid communication with, e.g. branched off from the first pilot pressure line. In a fail safe event, for example when a detrimental hydraulic pressure is built up in the first pressure circuit, the second pilot pressure is dropped by the at least one first pressure regulator to switch the NO drain valve from a closed actuated state to an open unactuated state, so as to at least partially relieve hydraulic pressure from the first pressure circuit through the drain line, therefore resulting in a redundant passive fail safe of the hydraulic system. The fail safe provided by the drain valve avoids the use of expensive additional valves in the clutch and/or the brake actuation line. Also, the first pressure relief valve may not be suitable to rapidly relieve the first pressure circuit when desired, contrary to the drain valve.

The pressure regulator will drop the pilot pressure in the first and the second pilot pressure line below the preset value required for actuation of the drain valve and first pressure relief valve, when an unexpected pressure build-up in at least one of the clutch and/or brake actuation lines connected with the first pressure circuit of the hydraulic system, for example due to a mechanical and/or electrical malfunction, is detected. As a result, the NO drain valve will open to drain the excessive pressure from the first pressure circuit.

The cost of a hydraulic system of a multiple friction transmission can be reduced, while avoiding the need to arrange redundant solenoid valves that are connected hydraulically one behind the other in series in the clutch and/or brake actuation line. According to an aspect, a hydraulic system is obtained with a passive fail safe valve. This hydraulic system does not require expensive technical features to be capable of meeting the challenges associated with providing said fail safe. The hydraulic system will maintain a safe operation of the transmission when a pressure build up occurs in pressure circuit connected with the clutch and/or brake actuation line, for example due to a mechanical, electronic, electrical failure of one or more of the components. The hydraulic system can also be used for cooling of a clutch and/or brake of the transmission.

Optionally, the drain valve is a normally-open (NO) directional valve. By arranging a NO drain valve, a passive fail safe of the hydraulic system can be obtained, wherein a pilot pressure and/or an electric current is not required for the hydraulic system to be able to drain the first pressure circuit so as to reduce the hydraulic pressure in at least one of the clutch and/or actuation lines, for example in case of a detrimental pressure build up in said actuation lines.

Optionally, the drain valve is a normally-closed (NC) directional valve. The hydraulic system comprising a NC drain valve will require a second pilot pressure, which is provided to the drain valve by the first pressure regulator via the second pilot pressure line, to open the drain valve so as to drain the first pressure circuit, for example in case of a detrimental pressure build up in at least one of the clutch and/or actuation lines.

The hydraulic system can comprise a second pressure circuit, which is supplied with pressurized fluid via a second pressure pump outlet line, wherein the second pressure circuit is connected to the first pressure circuit by the pressure controlled hydraulic line. The second pressure circuit may be at a lower pressure than the first pressure circuit. The first pressure relief valve in the pressure controlled hydraulic line is arranged to feed the second pressure circuit, and/or to drain excessive hydraulic pressure from the first pressure circuit to the second pressure circuit.

The first pressure circuit, which has a higher pressure than the second pressure circuit, can be regarded as the actuation circuit. The drain valve provides a safety redundancy by draining the first pressure circuit in case of desired depressurization of the first pressure circuit, for instance due to a mechanical, electronic or electrical of a component on which the hydraulic system depends.

The at least one first pressure regulator can be arranged in the second pressure circuit, i.e. the first and second pilot pressures are branched off from the second pressure circuit.

The hydraulic system can be arranged so that the first pressure relief valve and drain valve are operated sequentially by the first pressure regulator. The first pressure relief valve is regulated by the first pressure regulator, which is arranged to increase pressure from the first pressure circuit with increasing pilot pressure. The first pressure regulator can be controlled by an electric current, wherein a higher electric current can result in a higher pilot pressure.

When the hydraulic system is initiated, the drain valve will be closed by the first pilot pressure on the first pilot pressure line connected the drain valve. Next, the first pressure regulator will regulate the pressure in the first pressure circuit by controlling the drain valve. Therefore, using a single first pressure regulator for operating both the drain valve and the first pressure relief valve, the drain valve can be sequentially closed with increasing pilot pressure and subsequently the pressure in the first pressure circuit can be regulated. The pressure in the first pressure circuit can increase with increasing pilot pressure, which is regulated by the electric current provided to the first pressure regulator. A higher electric current can result in a higher pilot pressure output from the first pressure regulator. Additionally, using a single pressure regulator for actuating and/or controlling respectively the first pressure relief valve and the drain valve can reduce the total cost of the hydraulic system, while the drain valve adds a safety redundancy to the clutch action system of the hydraulic system.

Optionally, the second pressure circuit further comprises a second pressure relief valve for relieving the second pressure circuit pressure, for example, into the inlet of the at least one pressure pump or in any other drain means, such as a fluid container.

Optionally, the at least one first pressure regulator is a normally-closed (NC) solenoid valve, wherein, in the actuated state, the solenoid valve is open to feed the first and second pilot pressure to the first and second pilot pressure line; and wherein, in the unactuated state, the solenoid valve is closed to release the first and second pilot pressure of the first and second pilot pressure line.

When the first pressure regulator loses power, for instance due to a malfunction, the pilot pressure will be lost, by which the drain valve will open. In this case, the first pressure circuit will be depressurized, assuring no torque transfer through the transmission.

An unexpected pressure build-up in the first pressure circuit of the hydraulic system, for example due to a malfunction, is detected and the NC solenoid valve is powered off, after which the NC solenoid valve is switched from an actuated state, wherein the valve is open for providing pilot pressure to a first and second pilot pressure line, to an unactuated state, wherein the valve is closed and the pilot pressure in the first and second pilot pressure line drops below the preset value required for actuation of the drain valve and first pressure relief valve. As a result, the NO drain valve will open to drain the excessive pressure from the first pressure circuit.

In principle, the drain valve may also be arranged in the hydraulic system as a NC drain valve which is operated by a NO solenoid valve. The hydraulic system comprising a Normally Low NL (NC) solenoid valve for providing a pilot pressure to the NO drain valve, or alternatively comprising a Normally High NH (NO) solenoid valve for providing a pilot pressure to the NC drain valve, improves safety, since a passive failsafe is provided when for example the electric power fails.

The at least one pump can supply pressurized fluid to respectively the first pressure circuit and the second pressure circuit. Since the drain valve is a NO directional valve, the first pressure circuit will be first drained. The first pressure regulator in the second pressure circuit will supply a first pilot pressure and a second pilot pressure to the drain valve and the first pressure relief valve, respectively. The first pressure regulator will sequentially first switch the drain valve from an open state to a closed state, by means of the second pilot pressure on the second pilot pressure line connected to the drain valve, then the pressure regulator will regulate the first pressure relief valve by means of the first pilot pressure on the first pilot pressure line.

Optionally, the at least one first pressure regulator is a normally-open (NO) solenoid valve, wherein, in the actuated state, the solenoid valve is closed to release the first and second pilot pressure of the first and second pilot pressure line; and wherein, in the unactuated state, the solenoid valve is open to feed the first and second pilot pressure to the first and second pilot pressure line. Advantageously, a NO pressure regulator is arranged in combination with a NC drain valve. In this way, for example in case of a detrimental pressure build up in at least one of the clutch and/or brake actuation lines, the NO pressure regulator can provide a pilot pressure to the NC drain valve which is sufficient to switch the NC drain valve from a closed state to an open state, in which the first pressure circuit can be drained through the drain valve.

Optionally, the at least one direct acting solenoid valve is arranged between the first pressure circuit and respectively the brake actuation line or the clutch actuation line. Both actuation lines are linked to the multiple friction transmission.

Optionally, the drain valve releases into a pressure reservoir which comprises a connection to an inlet of the pump.

Optionally, the hydraulic system further comprises a dual cooling system comprising a cooler which is arranged in the second pressure circuit, and at least two hydraulic lines for cooling the at least two wet friction elements, such as a clutch and a brake, i.e. a clutch cooling line and a brake cooling line.

At least two wet friction elements are comprised in the wet friction transmission. The friction elements can be a clutch and/or a brake and require cooling when dissipating power, for instance when transmitting increasing torque as a result of an increasing hydraulic actuation pressure. The cooling system plays an important role for the efficiency of the transmission. Therefore it is important to provide an efficient cooling strategy to increase the overall efficiency of the transmission. The efficiency of the cooling system is related to the flow rate in the cooling circuit. For a DCT, two cooling circuits are provided, since the mechanical power is not equally distributed over the two clutches. The clutch which dissipates more power compared to the other clutch, will typically require more cooling. Therefore, the cooling is preferably regulated separately to provide cooling proportional to the power dissipation of the friction element. Also, gear synchronization may be prevented when the mechanical losses rise too high. In this situation, the cooling is regulable so that it can be turned off at least temporarily to enable gear change. Excessive flooding of the clutch assemblies with cooling fluid, which results in clutch drag, can be avoided, resulting in higher fuel efficiencies.

Optionally, the clutch cooling line and brake cooling line comprise at least one normally-closed (NC) cooling valve, respectively.

Optionally, the at least one NC cooling valve, in the respective clutch cooling line and brake cooling line, is operated by a second pressure regulator and third pressure regulator, which are NL (Normally Low) solenoid valves arranged in the second pressure circuit.

A dual cooling system provides individual clutch cooling, wherein each clutch is cooled by an individual cooling circuit which both are regulated by a pressure regulator, i.e. a second pressure regulator and a third pressure regulator. A hydraulic system with a separate cooling for the individual clutches has the advantage that cooling is only applied where necessary. Without a separate or individual cooling of each of the clutches, more oil flow would be required in the cooling circuit to achieve the same cooling effect per friction element, which would require a larger pump and hence more fuel consumption. Therefore, a dual cooling system can increase the efficiency of the hydraulic system.

Further, a dual cooling system can solely cool one clutch which is dissipating more power, thereby reducing the drag losses in the open clutch, which results in a reduction of the fuel consumption.

Furthermore, by reducing drag torque on the synchronizer, it is possible to preselect gears on a particular shaft when shutting off the cooling on a clutch, without shutting off the cooling on the other clutch.

Since the actual cooling flows can be regulated, a minimum flow can be chosen in order to minimize drag losses, and consequently fuel consumption.

Also, in a fail situation, the cooling of the clutch and the brake can be ceased. In this situation, the absence of cooling may be dangerous for the components and/or reduce the lifetime of said components. However, this arrangement provides an extra safety aspect. In certain situations, it is possible that the vehicle will unexpectedly set off due to the losses by the cooling. This safety crisis can be avoided by the arrangement of a NC cooling valve. Thus, the second pressure regulator and third pressure regulator are arranged as NL solenoid valves to ensure a minimal drag torque on the friction elements in case of an electrical error, avoiding unintended drive away due to this drag torque.

Optionally, the hydraulic system further comprises at least one lube line branching off at the second pressure circuit for lubrication of the wet multiple friction transmission.

Optionally, the at least one pump, arranged to provide pressure in the first pressure circuit and the second pressure circuit, is a dual port pump.

The at least one pump may be arranged as a dual port vane pump with a first pressure and second pressure port feeding the first pressure circuit and the second pressure circuit, respectively, wherein the output pressure at the first pressure port is higher than the output pressure at the second pressure port. The use of such dual port vane pump makes the use of multiple pumps in the hydraulic system unnecessary. Further, the pump may be arranged as an adjustment pump for providing variable pressure fluid flow.

Optionally, the multiple friction transmission is a dual clutch transmission.

The hydraulic system according to the present invention can be used to actuate, lubricate and/or cool a wet friction transmission.

While the first pressure circuit provides actuation of the friction elements (clutches and/or brakes) of the multiple friction transmission, the second pressure circuit, which has preferably a lower pressure than the first pressure circuit, can preferably be used for lubrication and/or cooling of elements of the friction elements of the multiple friction transmission.

Another aspect of the invention is to provide a hydraulic system for a multiple friction transmission, comprising a cooling system enabling a cooling strategy providing for better control over the cooling fluid while maintaining low cost.

Significant increases in fuel economy and vehicle performance can be achieved by the hydraulic system according the present invention.

In the present disclosure, the shown embodiments include one clutch and one brake, however, other combinations of friction elements are possible. For example two clutches (or two brakes or one clutch and one brake) can be applied. In other embodiments, any combination of clutches or brakes, e.g. one clutch, three clutches, four clutches, etc., can be arranged.

The invention further relates to a method for controlling pressure in a hydraulic system according to the invention, comprising: supplying pressurized fluid to the first pressure circuit using a pump; closing normally open drain valve by a first pilot pressure from a first pressure regulator; regulating the pressure in the first pressure circuit by the first pressure relief valve by a second pilot pressure from the first pressure regulator; wherein, in the event of a detrimental hydraulic pressure build up in the first pressure circuit, at least the second pilot pressure is dropped by the at least one first pressure regulator to switch the NO drain valve from a closed actuated state to an open unactuated state, so as to at least partially relieve hydraulic pressure from the first pressure circuit through the drain line. In this way, a redundant passive fail safe of the hydraulic system can be obtained.

Further advantageous embodiments are represented in the subclaims.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
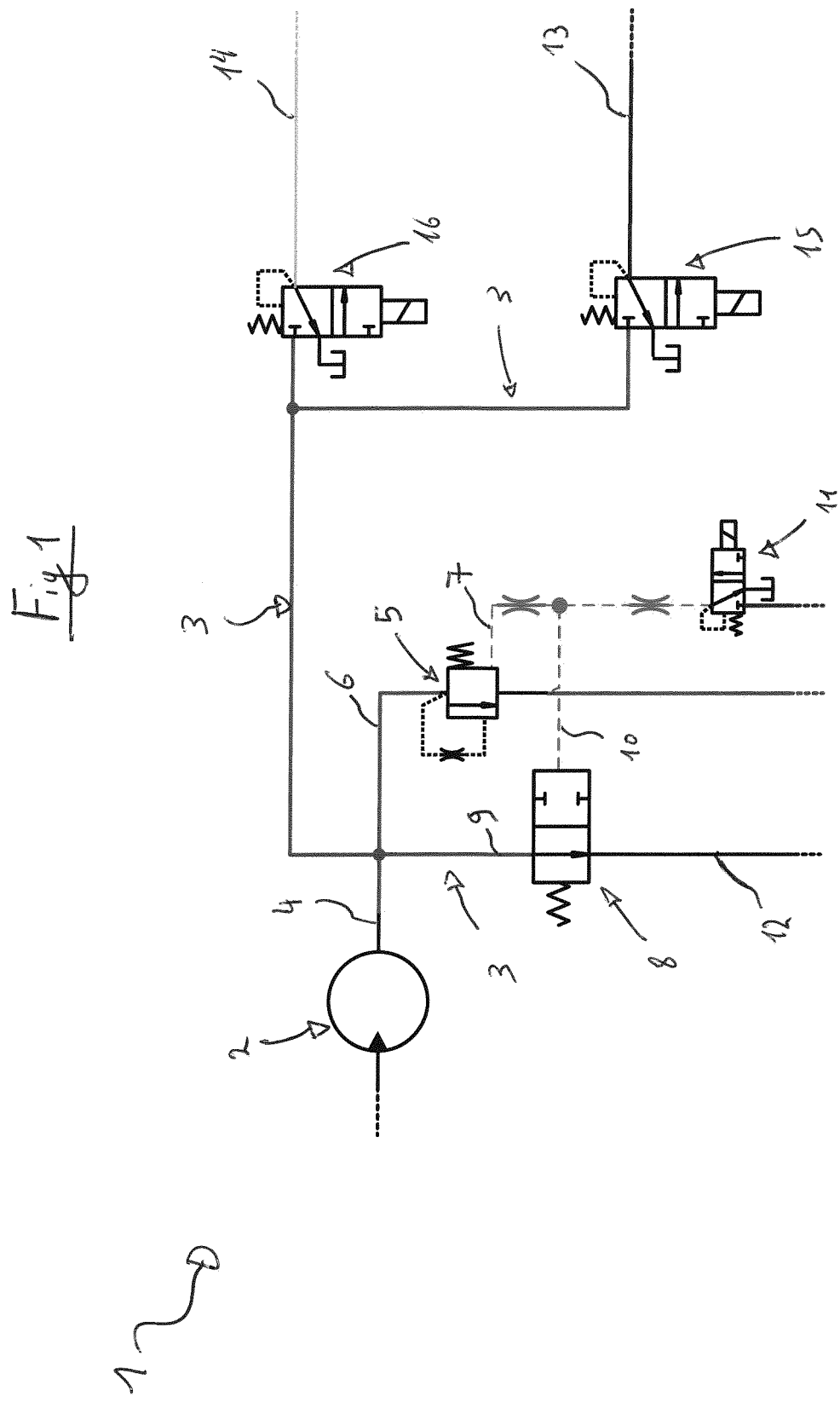
FIG. 1 shows a schematic diagram of an embodiment of a hydraulic system according to the present invention.

A schematic diagram of an embodiment of a hydraulic system 1, for a multiple friction transmission comprising at least two friction elements, according to the present invention, is shown in FIG. 1. This exemplary embodiment is illustrated for a multiple friction transmission comprising two friction elements, namely a clutch element and a brake element. The hydraulic system 1 comprises a pressure pump 2 which supplies pressurized fluid to a first pressure circuit 3 via a first pressure pump outlet line 4. The hydraulic system 1 further comprises a first pressure relief valve 5, which is arranged in a pressure controlled hydraulic line 6, branched off at the first pressure pump outlet line 4. The first pressure relief valve 5 is regulable by means of a first pilot pressure through a first pilot pressure line 7. The hydraulic system 1 further comprises a drain valve 8 which is arranged in a pressure drain hydraulic line 9, branched off at the first pressure pump outlet line 4, and which is different from the pressure controlled hydraulic line 6. The drain valve 8 is a NO directional valve 8 which is switchable between an open state and a closed state by means of a second pilot pressure through a second pilot pressure line 10. The hydraulic system 1 further comprises a first pressure regulator 11 for operating the first pressure relief valve 5 and the drain valve 8 by means of the first pilot pressure and the second pilot pressure, respectively. The second pilot pressure line 10 is in fluid communication e.g. branched off from the first pilot pressure line 7. The first pressure regulator 11 is arranged for switching the NO drain valve 8 from a closed actuated state to an open unactuated state by means of the second pilot pressure, in the event of a detrimental hydraulic pressure build up in the first pressure circuit, so as to at least partially relieve hydraulic pressure from the first pressure circuit 3 through the drain line 12. The hydraulic system 1 may further comprise, hydraulic lines for actuation of the wet friction elements of the multiple friction transmission. In the embodiment of FIG. 1, two hydraulic lines for actuation of a clutch element and a brake element, i.e. the clutch actuation line 13 and the brake actuation line 14, are each connected with the first pressure circuit 3 with a direct acting solenoid valve 15, 16 arranged therebetween. In some cases, for example during sudden pressure build up in one or more hydraulic actuation lines 13, 14, which are connected to a clutch and/or a brake, and branched off from the first pressure circuit 3, the first pressure relief valve 5 may not be suitable for proper draining of the pressure in the first pressure circuit 3, whereas the drain valve 8 may be suitable to handle the sudden pressure build up and relieve the pressure by draining pressurized fluid from the first pressure circuit 3. The pressurized fluid may be drained through the drain valve 8 to for example a reservoir, an inlet of the pump, an inlet of another pump, and/or another pressure circuit.

By arranging a NO drain valve 8 in the hydraulic system 1, a passive fail safe can be obtained, wherein a pilot pressure and/or an electric current is not required for the hydraulic system 1 to be able to drain the first pressure circuit 3 so as to reduce the hydraulic pressure in at least one of the clutch and/or actuation lines 13, 14, for example in case of a detrimental pressure build up in said actuation lines 13, 14. However, it is also possible to arrange the drain valve in the hydraulic system 1 as a NC directional valve. The hydraulic system comprising said NC drain valve will then require a second pilot pressure, which is provided to the drain valve by the first pressure regulator via the second pilot pressure line 10, to open the drain valve so as to drain the first pressure circuit 3, for example in case of a detrimental pressure build up in at least one of the clutch and/or actuation lines 13, 14.

Figure 2:
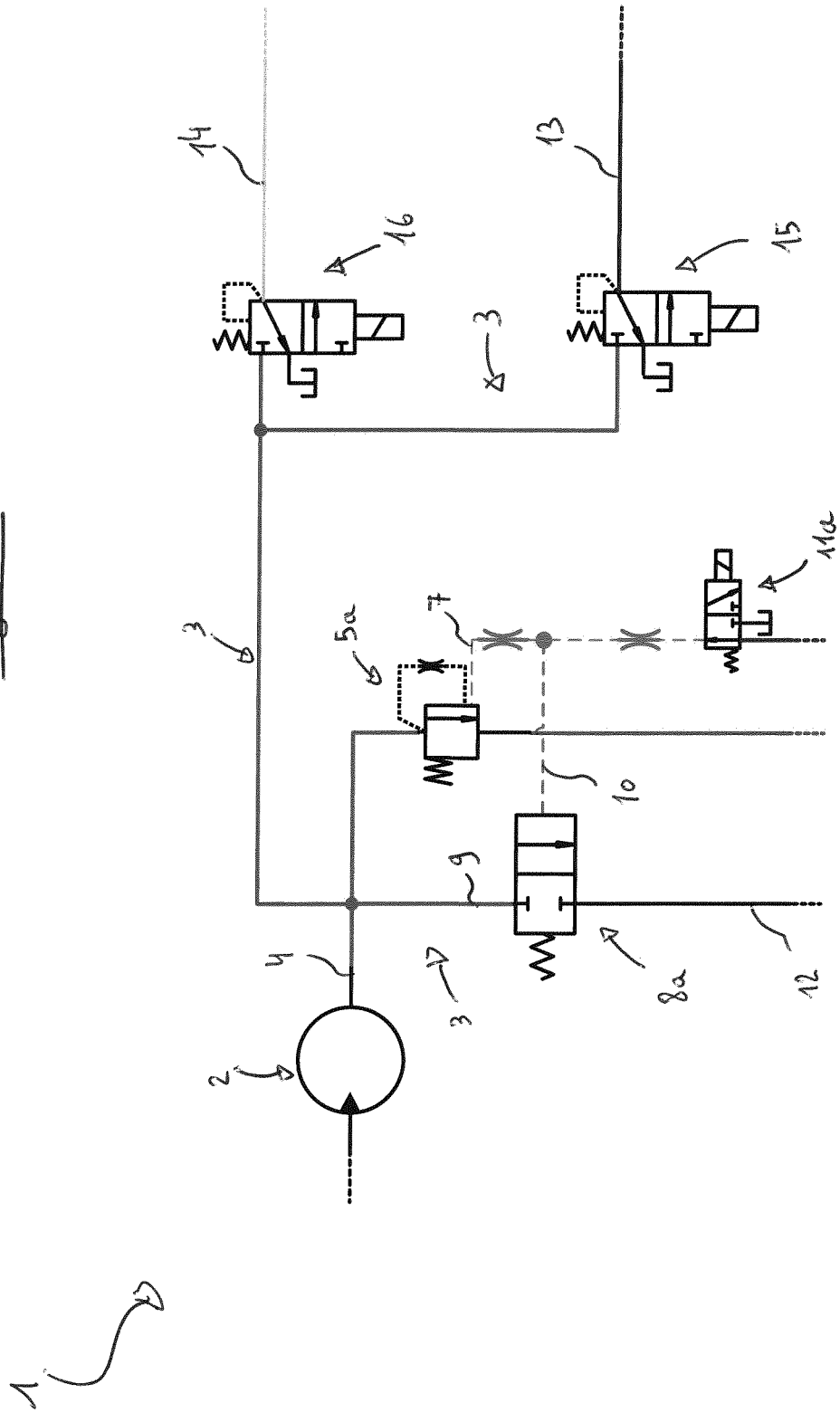
FIG. 2 shows a schematic diagram of another embodiment of a hydraulic system according to the present invention.

A schematic diagram of another exemplary embodiment of a hydraulic system 1 according to the present invention is shown in FIG. 2. The drain valve 8a is arranged as a NC directional valve 8a, switchable between an open state and a closed state by means of a second pilot pressure provided to said drain valve 8a through a second pilot pressure line 10. The first pressure regulator 11a is arranged as a NO solenoid valve. The NC drain valve 8a can be opened by the second pilot pressure provided through the second pilot pressure line 10. In the event of a detrimental hydraulic pressure build up in one or more hydraulic actuation lines 13, 14, the hydraulic system 1 can reduce the pressure in said actuation lines 13, 14 by draining the first pressure circuit 3 through the drain valve 8a to the drain line 12. In this case, the electric current provided to the solenoid will be dropped so that the NO first pressure regulator 11a will be switched from the actuated closed state to the unactuated open state. The pilot pressure provided by the first pressure regulator 11a to the first pilot pressure line 7 and the second pilot pressure line 10 will then be sufficiently high to regulate the first pressure relief valve 5a and to switch the NC drain valve 8a from an unactuated closed state to an actuated open state. Thus, the drain valve 8a will be opened by the second pilot pressure so as to drain the first pressure circuit 3.

Figure 3:
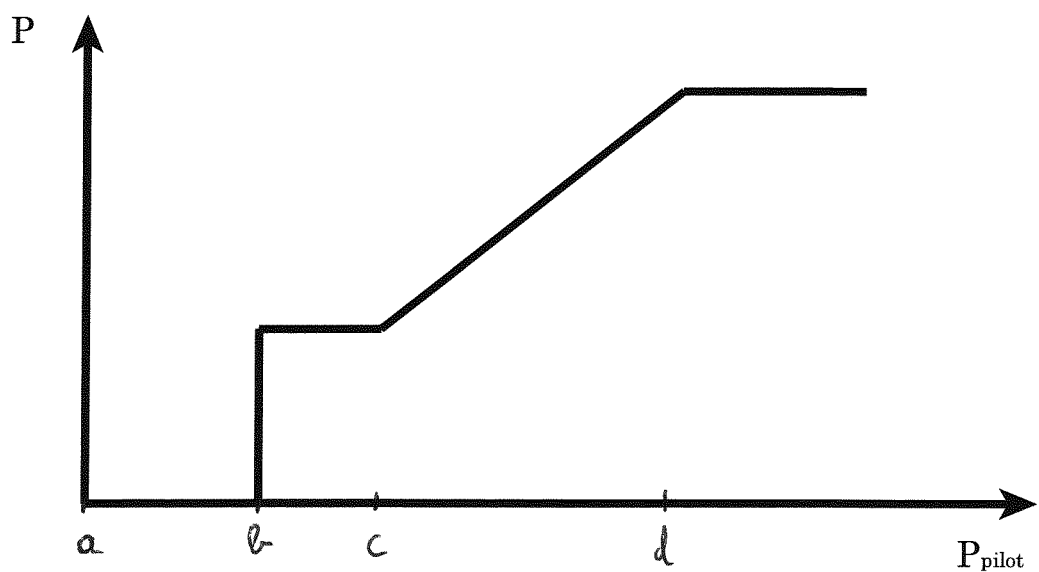
FIG. 3 shows a graph, illustrating the pressure characteristics of the exemplary embodiment shown in FIG. 1.

An overview of the sequential functionality of the drain valve 8 and the first pressure relief valve 5 can be illustrated by using a graph which shows a line pressure P in function of a pilot pressure $P_{pilot}$. The line pressure P is the hydraulic pressure in the first pressure circuit. Said first pressure relief valve 5 and said drain valve 8 are provided with a pilot pressure via the first pilot pressure line 7 and the second pilot pressure line 10, respectively. FIG. 3 depicts the relationship between the line pressure P and the pilot pressure $P_{pilot}$ for the embodiment of the hydraulic system 1 shown in FIG. 1. The pilot pressure $P_{pilot}$ from the first pressure regulator 11, which can be proportional to the electric current provided to the solenoid of the first pressure regulator 11, can be increased. The increase of the pilot pressure $P_{pilot}$ by the pressure regulator 11 will also increase the first pilot pressure and the second pilot pressure in the first pilot pressure line 7 and the second pilot pressure line 10, respectively. Initially, when increasing the pilot pressure $P_{pilot}$, the pressure may be too low to close the NO drain valve 8 which is in the normal open state. However, when the pilot pressure is gradually increased (point a to b), the pilot pressure $P_{pilot}$ will reach a value which is sufficient to close the NO drain valve 8 from an open state to a closed state (point b). When the drain valve 8 is closed, the line pressure P can be increased (point c to d) by regulating the pressure with relief valve 5, until a preferred line pressure (point d) is obtained. Thus, the NO drain valve 8 is first closed by the pilot pressure $P_{pilot}$ in the pilot pressure line 10, after which the line pressure P is sequentially increased until a preferred pressure value is obtained by regulating the relief valve 5 with the pilot pressure $P_{pilot}$ in pilot pressure line 7.

Figure 4:
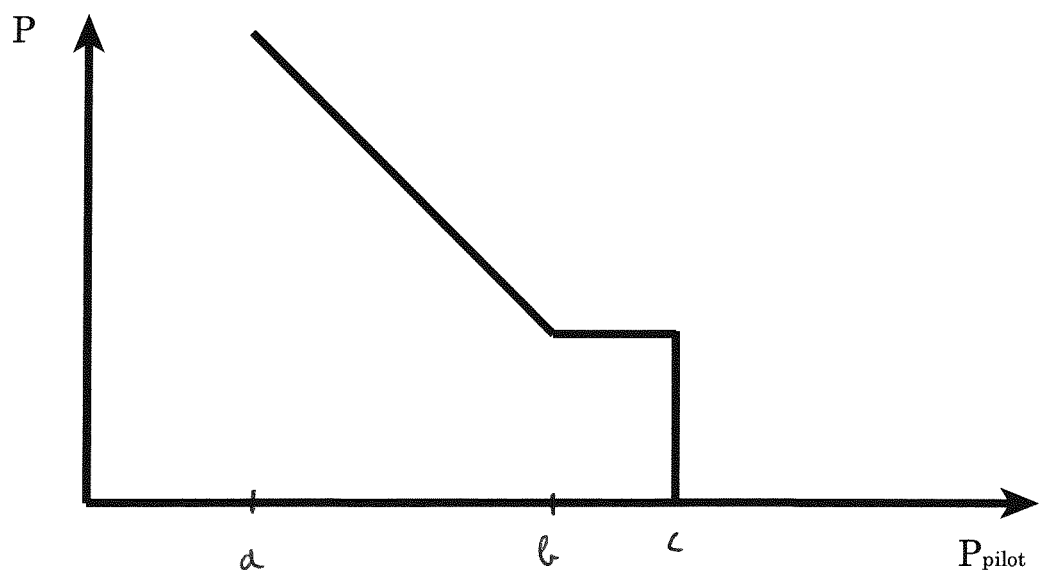
FIG. 4 shows a graph, illustrating the pressure characteristics of the exemplary embodiment shown in FIG. 2.

FIG. 4 shows the relation between the line pressure and the pilot pressure from the pressure regulator 11 for the exemplary embodiment shown in FIG. 2. In this embodiment, a NC drain valve is arranged in the hydraulic system 1. As shown in FIG. 4, the line pressure P is a function of the pilot pressure $P_{pilot}$ provided by the first pressure regulator 11. The line pressure P is gradually decreased (point a to b) by the first pressure relief valve 5a until the pilot pressure $P_{pilot}$ reaches a predetermined value (point b). When the pilot pressure is increased further, the second pilot pressure in the second pilot pressure line 10 will reach a value which is sufficient to switch the NC drain valve 8a from the unactuated closed state to the actuated open state (point c), in which the first pressure circuit 3 can be drained through the drain valve.

Figure 5:
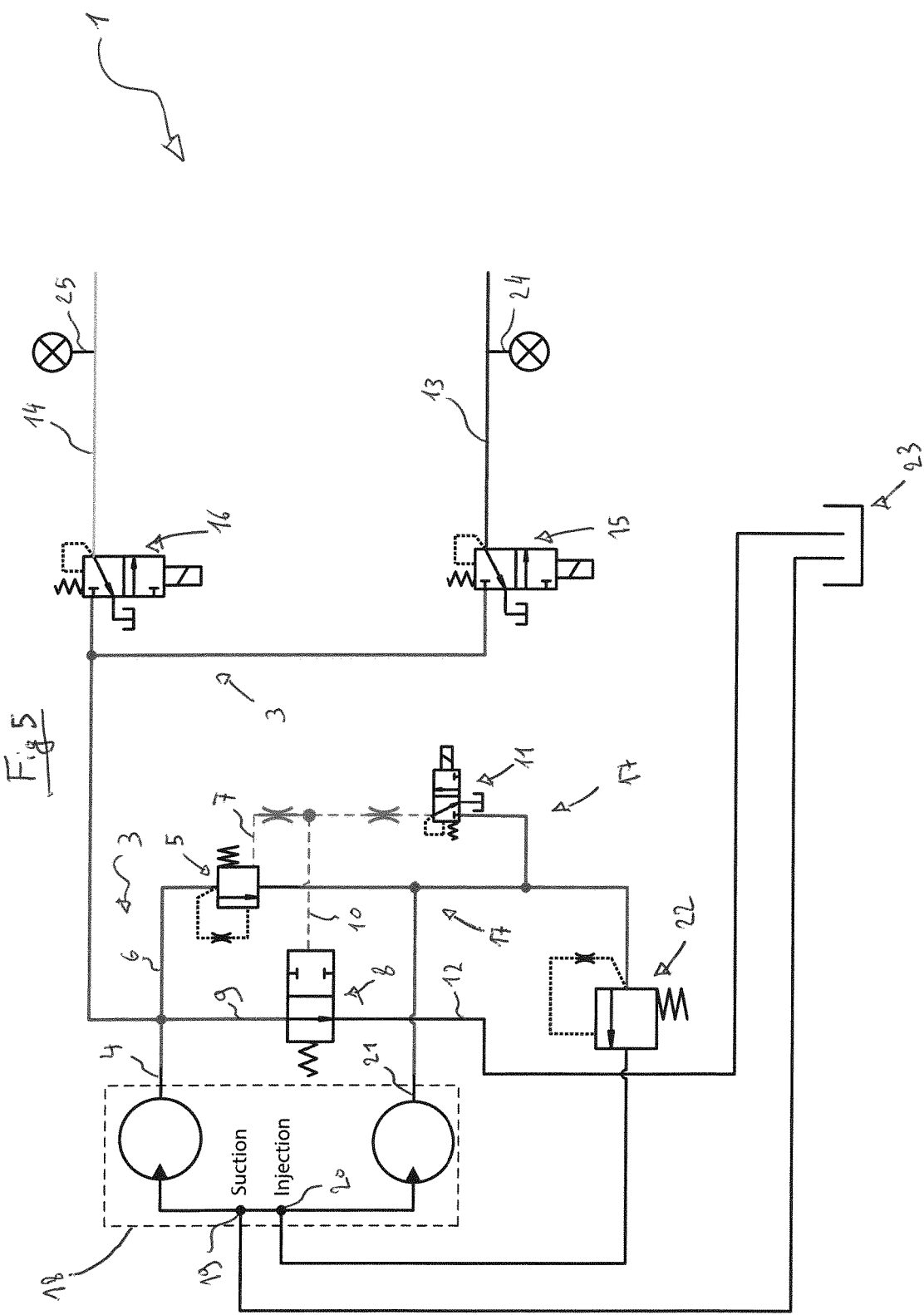
FIG. 5 shows a schematic diagram of another embodiment of a hydraulic system according to the present invention, including a second pressure circuit.

FIG. 5 shows another advantageous exemplary embodiment the hydraulic system 1 according to the present invention, wherein the hydraulic system 1 further comprises a second pressure circuit 17. In this embodiment, the pressure in the first pressure circuit 3 and the second pressure circuit 17 is provided by a dual port pump 18 comprising a suction inlet 19 and an injection inlet 20 and two outlets each connected with an outlet line 4, 21. The second pressure circuit 17 is supplied with pressurized fluid via a second pressure pump outlet line 21. Further, the second pressure circuit 17 is connected to the first pressure circuit 3 by the pressure controlled hydraulic line 6 through the first pressure relief valve 5. The second pressure circuit 17 is held at a lower pressure than the first pressure circuit 3. The dual port pump can for example be a vane pump, possibly asymmetric. The first pressure relief valve 5 in the pressure controlled hydraulic line 6 is arranged to feed the second pressure circuit 17, and/or to drain excessive hydraulic pressure from the first pressure circuit 3 to the second pressure circuit 17. Advantageously, the first pressure regulator 11 is arranged in the second pressure circuit 17. Further, the first pressure relief valve 5 and the drain valve 8 are controlled by the same first pressure regulator 11. The second pressure circuit 17 further comprises a second pressure relief valve 22 to control the pressure in the second pressure circuit 17 by relieving the second pressure circuit 17 into injection inlet 20 of the dual port pump 18 or any other drain circuit. The first pressure regulator 11 is a normally-closed (NC) solenoid valve 11, which in the actuated state is open to feed the first and second pilot pressure to respectively the first and second pilot pressure line 7, 10, and which in the unactuated state is closed to release the first and second pilot pressure of respectively the first and second pilot pressure line 7, 10. The first and second pilot pressures are branched off from the second pressure circuit. The second pilot pressure line 10 is in fluid communication, e.g. branched off from the first pilot pressure line 7. Two hydraulic lines for actuation of at least two wet friction elements, i.e. the clutch actuation line 13 and the brake actuation line 14, are connected with the first pressure circuit 3. A direct acting solenoid valve 15, 16 is arranged between the first pressure circuit 3 and respectively the brake actuation line 13 and the clutch actuation line 14. The drain valve 8 releases the pressure to a pressure reservoir 23, which is connected to the suction inlet 19 of the dual port pump 18.

Figure 6:
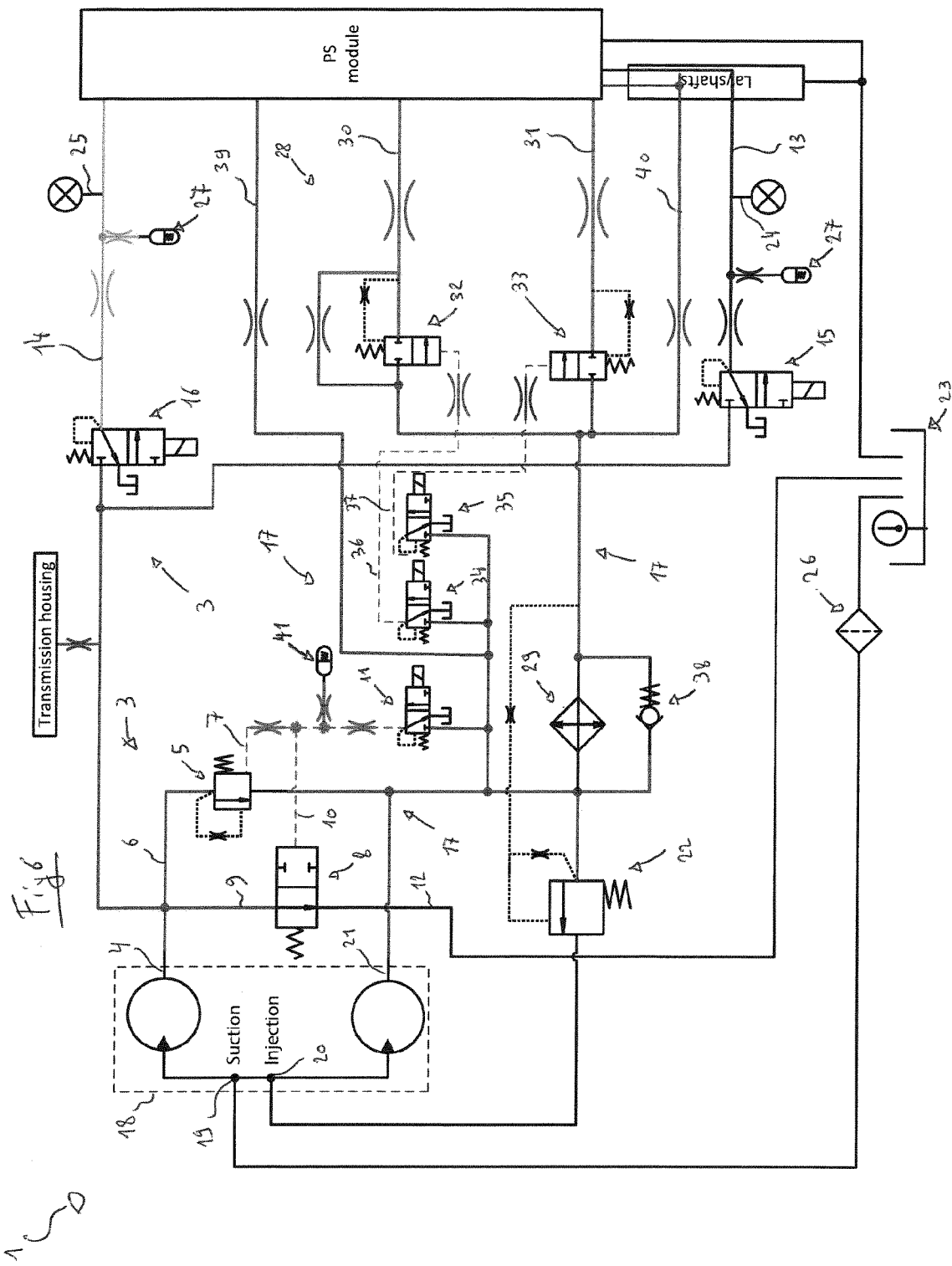
FIG. 6 shows a schematic diagram of another embodiment of a hydraulic system according to the present invention, including a second pressure circuit and a dual cooling system.

Another advantageous exemplary embodiment of the hydraulic system 1 according to the invention is shown in FIG. 6. The hydraulic system 1 of this embodiment is used for a multiple friction transmission of a vehicle, comprising wet friction elements, namely a clutch element and a brake element. The multiple friction transmission in this embodiment can be a DCT. The hydraulic system 1 further comprises a first pressure circuit 3 which is fed with pressurized fluid via a first pressure pump outlet line 4 of a dual port pump 18.

A first pressure relief valve 5, regulable by means of a first pilot pressure through a first pilot pressure line 7, is arranged in a pressure controlled hydraulic line 6 branched off at the first pressure pump outlet line 4.

A drain valve 8 is arranged in a pressure drain hydraulic line 9 branched off at the first pressure pump outlet line 4, said drain hydraulic line 9 is different from the pressure controlled hydraulic line 6. The drain valve 8 is a normally-open (NO) directional valve switchable between an open state and a closed state by means of a second pilot pressure through a second pilot pressure line. The drain valve 8 releases the pressure to a pressure reservoir 23, comprising a connection to the suction inlet 19 of the dual port pump 18. A filter is further arranged in a sump 26, which is arranged between the pressure reservoir 23 and the suction inlet 19 of the dual port pump 18, so that fluid (e.g. oil) of the hydraulic system 1 is sucked through an emerged suction filter in the sump 26. The drain valve 8 is spring biased to an open position, wherein the drain valve 8 is fully opened to communicate with a reservoir 23. The second pilot pressure from the second pilot pressure line 10 works against the bias spring, so that in the case that sufficient pilot pressure is acting on the drain valve 8 through the second pilot pressure line 10, the pilot pressure in said second pilot pressure line 10 will overcome the biasing force and change the state of the drain valve 8 from an open state to a closed state, wherein in the closed state the pressurized fluid from the first pressure circuit 3 is not drained through the drain valve 8 to the reservoir 23.

The hydraulic system 1 further comprises a first pressure regulator 11 for operating the first pressure relief valve 5 and the drain valve 8 by means of the first pilot pressure and the second pilot pressure, respectively. The first pressure regulator 11 is arranged for switching the NO drain valve 8 from a closed actuated state to an open unactuated state by means of the second pilot pressure, in the event of a detrimental hydraulic pressure build up in the first pressure circuit, so as to at least partially relieve hydraulic pressure from the first pressure circuit 3 through the drain line 9. Therefore, the hydraulic system 1 comprises a redundant passive fail safe, which can enhance the safety. The first pressure regulator 11, arranged in the second pressure circuit 3, regulates the pressure in the first pressure circuit 3 by controlling the first pressure relief valve 5 and the drain valve 8. The first pressure regulator 11 is a normally-closed (NC) solenoid valve 11. In the actuated state, the solenoid valve 11 is open, so as to feed the first and second pilot pressure to the first and second pilot pressure line 7, 10, respectively. In the unactuated state, the solenoid valve 11 is closed, so as to release the first and second pilot pressure of the first and second pilot pressure line 7, 10, respectively. The first and second pilot pressures are branched off from the second pressure circuit. The second pilot pressure line 10 is in fluid communication, e.g. branched off from the first pilot pressure line 7. The NC solenoid valve 11 further comprises a biasing element (spring) which biases said valve to a closed position, wherein the second pressure circuit 17 is closed to the first pilot pressure line and the second pilot pressure line 7, 10. When the solenoid of the first pressure regulator 11 is energized, the valve will electromechanically be operated to open, so that the second pressure circuit 17 can communicate and feed the first pilot pressure line and the second pilot pressure line 7, 10. Consequently, when the solenoid is energized and the valve member of the first pressure regulator is opened up, the pilot pressure in the first pilot pressure line 7 and/or the second pilot pressure line 10 will become able to operate the drain valve 8 and the first pressure relief valve 5, respectively. When the electric current which is used to operate the solenoid of the first pressure regulator 11 is too low, for example in case of an electrical, electronic and/or control system malfunction, the first pressure regulator 11 will fall back to the unactuated closed state. In this unactuated closed state, the first pressure regulator 11 is arranged to sufficiently depressurize the first pilot pressure line 7 and the second pilot pressure line 10. Optionally, a damper 41 can be arranged in a hydraulic line branched off at the first pilot pressure line 7 or the second pilot pressure line 10. The damper 41 is arranged to damp the pressure oscillations, so as to increase the pressure stability. In this way, adverse pressure peaks and/or pressure fluctuations in the pilot pressure lines 7, 10 can at least partially be smoothed out by the dampers 41.

The first pressure circuit 3 provides hydraulic actuation of the friction elements of a multiple friction transmission, namely a clutch element and a brake element. The hydraulic system 1 further comprises two hydraulic lines, connected with the first pressure circuit 3, each for actuation of respectively the clutch element and brake element, namely a clutch actuation line 13 and a brake actuation line 14. A direct acting solenoid valve 15, 16 is arranged between the first pressure circuit 3 and respectively the brake actuation line 14 and the clutch actuation line 13, for controlling the pressure on said line 13, 14. The clutch actuation line 13 and the brake actuation line 14 are each linked to the multiple friction transmission. The pressure of the clutch actuation line 13 and the brake actuation line 14 can be measured with pressure sensors 24, 25. Each actuation line 13, 14 can comprise a pressure sensor 24, 25. The measured pressure by the pressure sensor can be used by a hydraulic control system for controlling the hydraulic system 1. Advantageously, a damper 27 can be arranged in said clutch actuation line 13 and brake actuation line 14 to damp the pressure, so as to increase the pressure stability. For instance, adverse pressure peaks and/or pressure fluctuations can at least partially be smoothed out by the dampers 27 in the actuation lines 13, 14. The direct acting solenoid valves 15, 16 in the wet friction element actuation lines 13, 14 are normally closed directional control valves with three ports and two finite positions, i.e. a first open position and a second closed position. The solenoid valves can be electromechanically operated by an electrical current. The direct acting solenoid valves 15, 16 are spring biased to the first position, wherein the valve is closed. Said direct acting solenoid valves 15, 16 will be switched to the second position, or open position, when the solenoid is energized.

The hydraulic system 1 further comprises a second pressure circuit 17 supplied with pressurized fluid via a second pressure pump outlet line 21. The hydraulic system 1 is configured so that the second pressure circuit 17 is at lower pressure than the first pressure circuit 3. The second pressure circuit 17 is connected to the first pressure circuit 3 by the pressure controlled hydraulic line 6 through the first pressure relief valve 5. The first pressure relief valve 5 in the pressure controlled hydraulic line 6 is arranged to feed the second pressure circuit 17, and/or to drain excessive hydraulic pressure from the first pressure circuit 3 to the second pressure circuit 17.

The pressure of respectively the first pressure circuit 3 and the second pressure circuit 17 is provided by a dual port vane pump 18, comprising a first pressure port connected to the first pressure pump outlet line 4, and second pressure port connected to the second pressure pump outlet line 21, said outlet lines 4, 21 feeding said first pressure circuit 3 and said second pressure circuit 17, respectively. The output pressure at the first pressure port is higher than the output pressure at the second pressure port. The use of such dual port vane pump 18 may make the use of multiple separate pumps in the hydraulic system 1 unnecessary.

The second pressure circuit 17 further comprises a second pressure relief valve 22 to control the second pressure circuit pressure 17. The second pressure relief valve 22 connects the second pressure circuit 17 with the injection inlet 20 of the dual port pump 18. The second pressure relief valve 22 comprises a pressure biasing element, such as a spring, which is configured so that the pressure of fluid communicated to the inlet of the valve can be limited, taking into account the pressure at the inlet. Further, the second pressure relief valve 22 comprises a sensing port which communicates via an orifice with the hydraulic line connected to the inlet of the valve.

The first pressure relief valve 5 is arranged as a pressure regulating valve between the first pressure circuit 3 and the second pressure circuit 17. The first pressure relief valve 5 comprises an inlet which is connected to the first pressure circuit 3, and an outlet which is connected to the second pressure circuit 17. The pressure of the pressurized fluid in the second pressure circuit 17 is lower than the pressure in the first pressure circuit 3, when the hydraulic system 1 of the multiple friction transmission is active. Further, the first pressure relief valve 5, comprises a sensing port communicated via an orifice with the hydraulic pressure control line 6 in the first pressure circuit 3. The first pressure relief valve 5 also comprises a pressure setting spring, which is configured so that the pressure of the pressurized fluid (e.g. oil) at the inlet of the first pressure relief valve 5 is limited to a desired and/or designed pressure.

The hydraulic system 1 further comprises a dual cooling system 28, comprising a cooler 29 arranged in the second pressure circuit 17, and two hydraulic lines for cooling the clutch element and brake element, namely a clutch cooling line 30 and a brake cooling line 31. The clutch cooling line 30 and brake cooling line 31 each comprise a normally-closed (NC) cooling valve 32, 33, wherein each cooling valve 32, 33 is operated by a NL solenoid valve 34, 35 arranged in the second pressure circuit 17. The cooling flows in the clutch cooling line 30 and the brake cooling line 31 are each independently regulated by a cooling valve 32, 33. The cooling valves 32, 33 comprise a biasing member (spring) that acts on the valve member of the cooling valve to bias it to a normally closed position. The cooling valve 32 in the clutch cooling line 30 has a bypass line to ensure a constant minimum flow. The cooling valves 32, 33 have a feedback from the controlled pressure and are operated by second pressure regulator 34 and the third pressure regulator 35, respectively. The second pressure regulator 34 comprises a port connected to a third pilot pressure line 36 which communicates with the cooling valve 32 arranged on the clutch cooling line 30. Similarly, the third pressure regulator 35 comprises a port connected to a fourth pilot pressure line 37 which communicates with the cooling valve 33 arranged on the brake cooling line 31. The pilot pressure which is received by the cooling valves 32, 33 from the second pressure regulator 34 and the third pressure regulator 35, respectively, act against the biasing force of the biasing element of said cooling valves 32, 33. When the pilot pressure is sufficiently large, the cooling valve 32, 33 will open to selectively and independently provide a flow of cooling fluid to the wet friction element (clutch element, brake element). In this way, an accurate cooling flow can be applied by controlling the pressure drop over the cooling valve 32, 33. An external oil-to-water cooler 29 with a parallel bypass valve 38, for limiting the pressure drop over the cooler 29, is arranged in the second pressure circuit 17. The cooling and lubrication fluid can flow through the oil-to-water cooler 29 to realize the required heat-exchange in the hydraulic system 1. A temperature sensor is arranged in the sump or in proximity of the cooler, or both locations, to obtain a temperature measurement or an indication of the thermal behavior of the hydraulic system, which depends, among other aspects, on the energy dissipation in the wet friction elements, i.e. clutch element and brake element. Thus, the second pressure regulator 34 and the third pressure regulator 35, both arranged in the second pressure circuit 17, regulate the cooling of the friction elements of the multiple friction transmission. A damper may be arranged to damp the regulated pressure.

The NC solenoid valves of the second pressure regulator 34 and the third pressure regulator 35 each comprise a biasing element (spring) which biases the valve to a closed position, wherein the second pressure circuit 17 is not in direct fluid communication with the clutch cooling pilot pressure line 36 and the brake cooling pilot pressure line 37. When the solenoid of the pressure regulator 34, 35 is energized, the valve will electromechanically be operated to open, so that the second pressure circuit 17 can communicate and feed the pilot pressure line 36, 37 connected thereto. Consequently, when the solenoid is energized and the valve member of the pressure regulator 34, 35 is opened up, the pilot pressure in the pilot pressure line 36, 37 connected with the pressure regulator 34, 35 will become able to operate the cooling valve 32, 33, respectively. When the electric current to the solenoid is too low, for example in case of an electrical, electronic and/or control system malfunction, the pressure regulator 34, 35 will fall back to the unactuated closed state. In this unactuated closed state, the pressure regulator 34, 35 is arranged to sufficiently depressurize the pilot pressure line 36, 37 connected thereto.

The hydraulic system further comprising two lube lines 39, 40 branched off at the second pressure circuit for lubrication of the wet multiple friction transmission.

Figure 7:
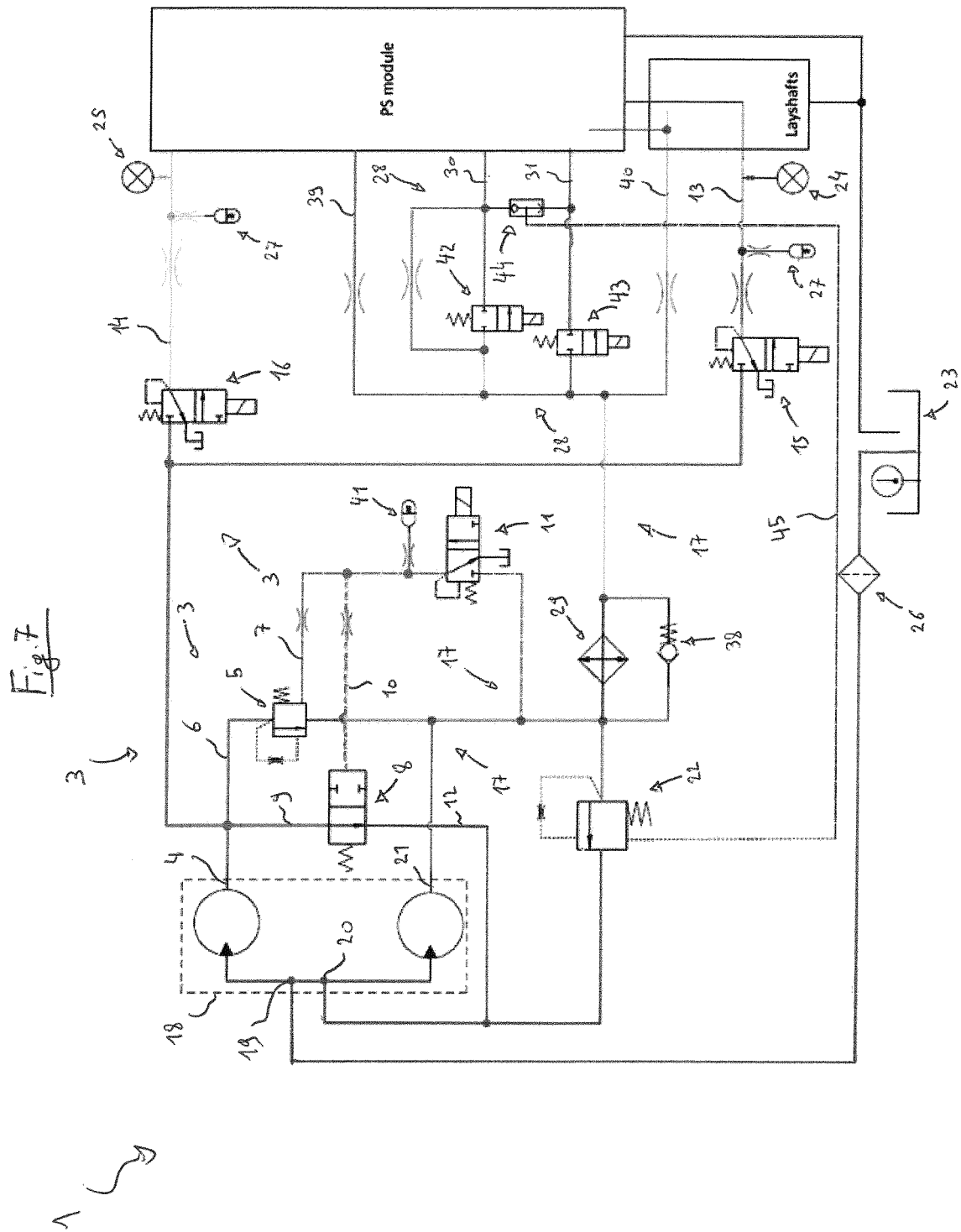
FIG. 7 shows a schematic diagram of another embodiment of a hydraulic system, including a dual cooling system comprising a shuttle valve.

FIG. 7 shows a schematic diagram of another embodiment of a hydraulic system 1 according to the present invention. The hydraulic line connected with the output of the drain valve 8 is connected with the injection inlet 20 of the dual port pump 18. The first pressure pump outlet line 4 of the dual port pump 18 is connected with the first pressure circuit 3 to feed pressurized fluid to said circuit 3. Further the second pressure pump outlet line 21 of the dual port pump 18 is connected with the second pressure circuit 17 to feed pressurized fluid to said circuit 17. The first pressure circuit 3 is connected with the second pressure circuit 17 through a first pressure relief valve 5, which can feed, and/or drain excessive oil, from the first pressure circuit 3 into the second pressure circuit 17. The first pressure relief valve 5 is controlled by the first pressure regulator 11. The first pressure relief valve 5 is thus arranged between the high pressure outlet and the low pressure outlet of the dual port pump 18, respectively connected with the first pressure pump outlet line 4 and the second pressure pump outlet line 21. The outlet of the second pressure relief valve 22 is connected with the injection inlet 20 of the dual port pump 18. Therefore, the hydraulic line connected with the outlet of the second pressure relief valve 22 communicates with the hydraulic line connected with the outlet of the drain valve 8. The drain valve 8 and the first pressure relief valve 5 are operated sequentially when the pilot pressure provided by the first pressure regulator 11 through respectively the first pilot pressure line 7 and the second pilot pressure line 10, is changed. In case of for example a mechanical, electrical, electronic or other kind of malfunction, causing a pressure build up in the first pressure circuit 3, the drain valve 8 will add a safety redundancy by draining the first pressure circuit 3 directly to the injection inlet 20 of the dual port pump 18. The first pressure circuit 3 is used for actuation of the friction elements (clutch element, brake element) through a clutch actuation line 13 and a brake actuation line 14.

The cooling system 28 of the embodiment shown in FIG. 7 comprises NC solenoid valves 42, 43 which are arranged as the cooling valves 42, 43 of the clutch cooling line 30 and the brake cooling line 31, respectively. The cooling valves 42, 43 can be directly controlled by the solenoids arranged therein. Therefore, it is not necessary to arrange a third and a fourth pressure regulator in the second pressure circuit 17 for operation of the cooling valves 42, 43 in the clutch cooling line 30 and the brake cooling line 31, respectively. The cooling valves 42, 43 are arranged as NC solenoid valves including a biasing element to automatically close the valve in case the solenoid is not actuated, for example in the case that an electric malfunction occurs by which the electric current to the solenoids is too low for actuation. The hydraulic system 1 further comprises a shuttle valve 44 arranged in a hydraulic line connecting the clutch cooling line 30 and the brake cooling line 31. The shuttle valve 44 is arranged for selecting the highest line pressure between the clutch cooling line 30 and the brake cooling line 31. Feedback is provided to the second pressure relief valve 22 through the feedback line 45 through which the shuttle valve 44 communicates with the second pressure relief valve 22, for keeping the pressure drop over the cooling lines 30, 31 substantially constant, which can be beneficial for assessing the cooling flow to the friction elements (clutch element, brake element) in the multiple friction transmission.

As mentioned earlier, the embodiment of FIG. 5-7 comprises a first pressure circuit 3 and a second pressure circuit 17, wherein the pressure of the pressurized fluid in the second pressure circuit 17 is lower than the pressure of the pressurized fluid in the first pressure circuit 3. For example, the pressure in the first pressure circuit 3 may typically be between 5 and 17 bar, and the pressure in the second pressure circuit 17 may typically be between 5 and 6 bar. The pressure in the first, second, third and fourth pilot pressure line 7, 10, 36, 37 may typically be between 0 and 5 bar. The pressure in the clutch actuation line 13 and the brake actuation line 14 may typically be between 0 and 15 bar. The pressure in the line connected to the pump injection port and the second pressure relief valve 22 may typically be between 0 and 1 bar. The above mentioned ranges of pressures in the hydraulic lines of the hydraulic system 1 are illustrative and should not be interpreted as restrictive of the scope of the present invention. Other configurations are possible, and within the scope of the present invention.

Further, a pressure sensor 24, 25 is arranged in the clutch actuation line 13 and the brake actuation line 14 to measure the pressure in said lines 13, 14. Advantageously, the pressure characteristics in the first pressure circuit 3 can be assessed by opening either one of the direct acting solenoid valves 15, 16, which are arranged in the clutch actuation line 13 and the brake actuation line 14, and measure the pressure with the pressure sensor 24, 25 on said lines 13, 14. Similarly, also the pressure first regulator 11 can be calibrated.

Advantageously, the drain valve, first pressure relief valve 5 and second pressure relief valve 22 can be arranged to have an asymmetric cove to influence the fluid inflow and outflow angle for compensation flow force effects on said valves 5, 22. Other valves in the hydraulic system may have such arrangement.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

The described solenoid valves 11, 15, 16, 34, 35 in the shown embodiments, comprise a solenoid, which can be controlled by a microprocessor-based electronic control device. An electronic control device can be arranged for controlling a hydraulic control system 1 for electronic control of the hydraulic system 1 according to the invention. The electronic control device may receive multiple parameters as input signal, coming from a plurality of sensors, for example ground speed signal, wheel speed, engine speed, engine throttle position, lever position, pressure, temperature, etc. It will be appreciated that the hydraulic control system, can be embodied as dedicated electronic circuits, possibly including software code portions. The hydraulic control system can also be embodied as software code portions executed on, and e.g. stored in, a memory of, a programmable apparatus such as a computer.

Although the present invention has been described in conjunction with specific embodiments related to a multiple friction transmission, and more specifically a dual clutch transmission (DCT), it will be appreciated that the hydraulic system according to the invention may also be used for other types of transmissions requiring a hydraulic system 1. Further, the hydraulic system 1 could also be used to control fluid communication with other higher and/or lower pressure hydraulic functions, such as for example steering, brakes, suspension, etc. Accordingly, this invention is intended to embrace all such alternatives, modifications and variations which fall within the spirit and scope of the appended claims.

Other modifications, variations, and alternatives are also possible. The specifications, figures and examples are, accordingly, to be regarded in an illustrative sense rather than in a restrictive sense. The invention is intended to embrace all alternatives, modifications and variations which fall within the spirit and scope of the appended claims.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A hydraulic system for a vehicle transmission with multiple friction elements for coupling and transmitting engine power to wheels of a vehicle by actuation of the friction elements via said hydraulic system, said hydraulic system comprising:
   at least one pressure pump supplying pressurized fluid to a pressure circuit via a first pressure pump outlet line, the pressure circuit in fluid connection with a friction element actuation line actuating a friction element;
   at least one first pressure regulator for operating a first pressure relief valve by means of a first pilot pressure through a first pilot pressure line;
   said first pressure relief valve arranged in a pressure controlled hydraulic line branched off at the first pressure pump outlet line, wherein the first pressure relief valve is controlled by means of the first pilot pressure to control the pressure in the pressure circuit;
   wherein a drain valve is arranged in a pressure drain line branched off at the first pressure pump outlet line, different from the pressure controlled hydraulic line, said drain valve being a directional valve switchable between an open state and a closed state by means of a second pilot pressure through a second pilot pressure line, said second pilot pressure in fluid communication with the first pilot pressure.

2. The hydraulic system according to claim 1, wherein the drain valve is a normally-open (NO) directional valve.

3. The hydraulic system according to claim 1, wherein the drain valve is a normally-closed (NC) directional valve.

4. The hydraulic system according to claim 1, said pressure circuit being a first pressure circuit and wherein the system further comprises a second pressure circuit supplied with pressurized fluid via a second pressure pump outlet line, the second pressure circuit connected to the first pressure circuit by the pressure controlled hydraulic line, wherein the first pressure relief valve in the pressure controlled hydraulic line is arranged to feed the second pressure circuit, and/or to drain excessive hydraulic pressure from the first pressure circuit to the second pressure circuit.

5. The hydraulic system according to claim 4, wherein the at least one first pressure regulator is arranged in the second pressure circuit.

6. The hydraulic system according to claim 4, wherein the second pressure circuit further comprises a second pressure relief valve to control the second pressure circuit pressure.

7. The hydraulic system according to claim 1, wherein the at least one first pressure regulator is a normally-closed (NC) solenoid valve, wherein, in an actuated state, the solenoid valve is open to feed the first and second pilot pressure to the first and second pilot pressure line, respectively; and wherein, in an unactuated state, the solenoid valve is closed to release the first and second pilot pressure of the first and second pilot pressure line, respectively.

8. The hydraulic system according to claim 7, wherein at least one direct acting solenoid valve is arranged between the pressure circuit and respectively a clutch actuation line and a brake actuation line.

9. The hydraulic system according to claim 1, wherein the drain valve releases into a pressure reservoir comprising a connection to an inlet of the at least one pump.

10. The hydraulic system according to claim 4, wherein a brake and clutch are formed by respective wet friction elements, the hydraulic system further comprising a dual cooling system comprising a cooler arranged in the second pressure circuit, and at least two hydraulic lines for cooling the respective wet friction elements via a clutch cooling line and a brake cooling line.

11. The hydraulic system according to claim 10, wherein the clutch cooling line and brake cooling line comprise at least one normally-closed (NC) cooling valve, respectively.

12. The hydraulic system according to claim 11, wherein the at least one NC cooling valve, in the respective clutch cooling line and brake cooling line, is operated by a NL solenoid valve arranged in the second pressure circuit.

13. The hydraulic system according to claim 4, further comprising at least one line branching off at the second pressure circuit for lubrication of the transmission.

14. The hydraulic system according to claim 4, wherein the at least one pump, arranged to provide pressure in the first pressure circuit and the second pressure circuit, is a dual port pump.

15. A method for controlling pressure in a hydraulic system for a vehicle transmission with multiple friction elements for coupling and transmitting engine power to wheels of a vehicle by actuation of the friction elements via said hydraulic system, the method comprising:
- supplying pressurized fluid to a pressure circuit in fluid connection with a friction element of the transmission;
- operating a first pressure relief valve by means of a first pilot pressure through a first pilot pressure line; said first pressure relief valve arranged in a pressure controlled hydraulic line branched off at a first pressure pump outlet line to control the pressure in the pressure circuit;
- switching a drain valve in a pressure drain line branched off at the first pressure pump outlet line, different from the pressure controlled hydraulic line, said drain valve being a directional valve, switchable between an open state and a closed state by means of a second pilot pressure through a second pilot pressure line, said second pilot pressure in fluid communication with the first pilot pressure.

* * * * *